United States Patent
Weaver

(10) Patent No.: US 6,951,441 B2
(45) Date of Patent: Oct. 4, 2005

(54) STORAGE RACK HAVING ROLLER TRACK SUPPORTED ON HORIZONTALLY EXTENDING FRONT AND BACK BEAMS

(75) Inventor: Carlton David Weaver, Goodells, MI (US)

(73) Assignee: Unarco Material Handling, Inc., Springfield, TN (US)

( * ) Notice: Subject to any disclaimer, the term of this patent is extended or adjusted under 35 U.S.C. 154(b) by 216 days.

(21) Appl. No.: 10/229,825

(22) Filed: Aug. 28, 2002

(65) Prior Publication Data

US 2004/0042879 A1 Mar. 4, 2004

(51) Int. Cl.[7] ............................................. B65G 1/00
(52) U.S. Cl. ................... 414/276; 193/35 C; 211/151
(58) Field of Search ..................... 414/276; 211/151; 193/37, 35 R, 35 C

(56) References Cited

U.S. PATENT DOCUMENTS

| | | | | |
|---|---|---|---|---|
| 1,737,971 A | * | 12/1929 | Law | 211/182 |
| 2,669,361 A | * | 2/1954 | Just | 211/59.2 |
| 2,696,283 A | * | 12/1954 | Barry | 195/35 C |
| 2,891,677 A | * | 6/1959 | Ritchie | 211/151 |
| 2,950,014 A | * | 8/1960 | Sullivan | 211/151 |
| 2,969,863 A | * | 1/1961 | Woldring et al. | 193/35 R |
| 3,145,810 A | * | 8/1964 | Ellard et al. | 52/481.1 |
| 3,726,376 A | * | 4/1973 | Gotham et al. | 193/35 R |
| 3,924,718 A | * | 12/1975 | Kornylak | 193/35 R |
| 4,007,841 A | * | 2/1977 | Seipel | 211/59.1 |
| 4,383,614 A | * | 5/1983 | Miller | 211/59.2 |
| 4,955,490 A | | 9/1990 | Schäfer | |
| 5,383,562 A | * | 1/1995 | Gay | 211/181.1 |
| 5,472,179 A | * | 12/1995 | Wendt et al. | 266/279 |
| 5,474,412 A | | 12/1995 | Pfeiffer et al. | |
| 5,951,228 A | | 9/1999 | Pfeiffer et al. | |
| 6,132,158 A | | 10/2000 | Pfeiffer et al. | |
| 6,302,036 B1 | * | 10/2001 | Carson | 108/110 |
| 6,641,352 B2 | * | 11/2003 | Pfeiffer | 414/276 |

* cited by examiner

*Primary Examiner*—Thomas J. Brahan
(74) *Attorney, Agent, or Firm*—Wood, Phillips, Katz, Clark & Mortimer

(57) ABSTRACT

A storage rack comprises horizontally extending front and back beams having upper surfaces, on which is supported a roller track comprising two side rails, a series of rollers journalled between and projecting above the side rails, and a series of tie rods extending between and bracing the side rails. The roller track is secured to the front and back beams by a front clip embracing an underside of the front beam, a J-bolt connected to the front clip and hooked over a front one of the tie rods, a back clip embracing an underside of the back beam, and a J-bolt connected to the back clip and hooked over a back one of the tie rods.

2 Claims, 2 Drawing Sheets

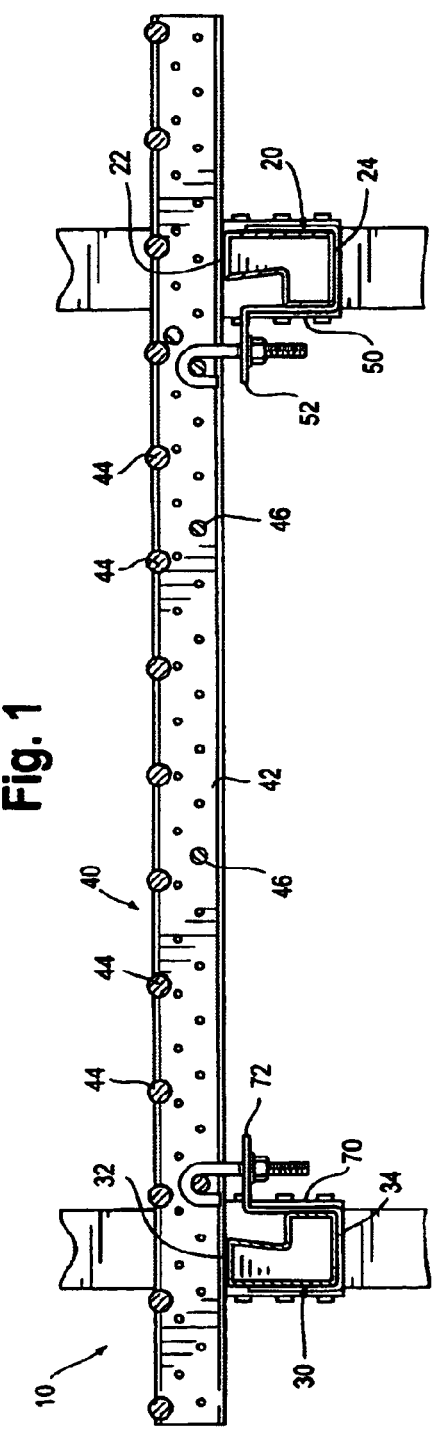
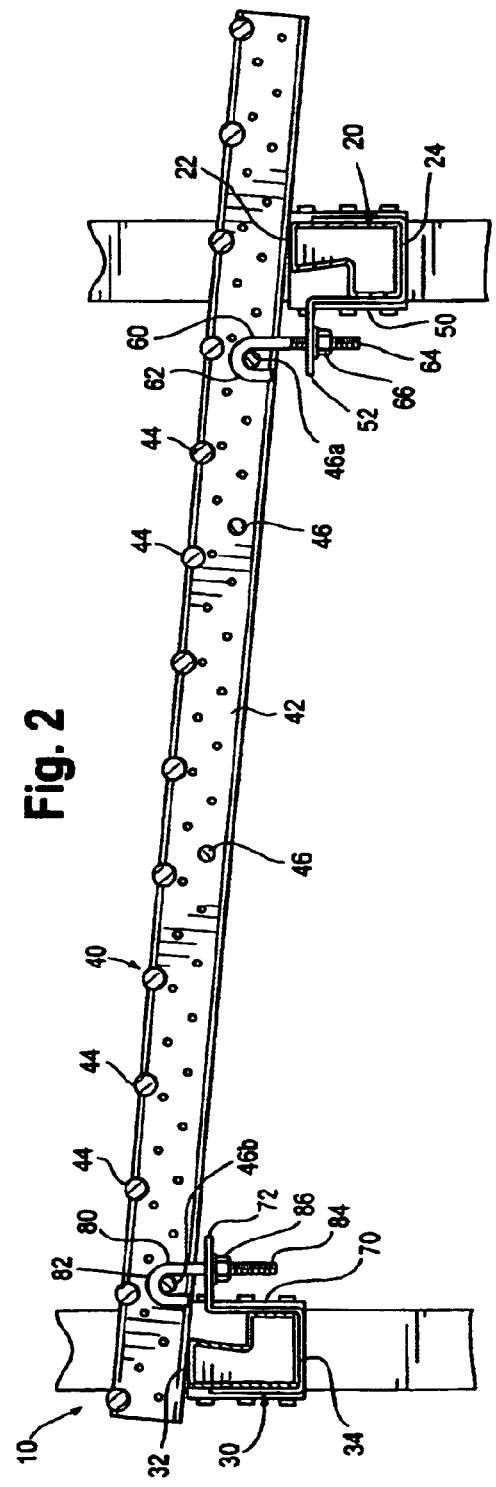

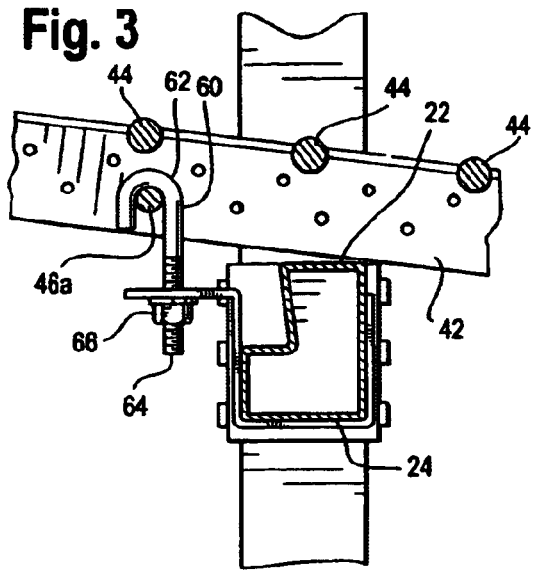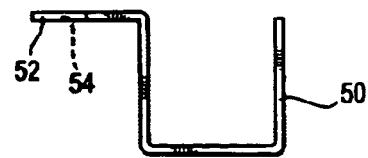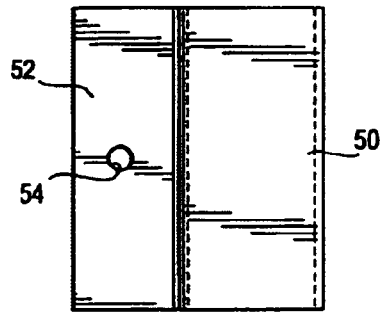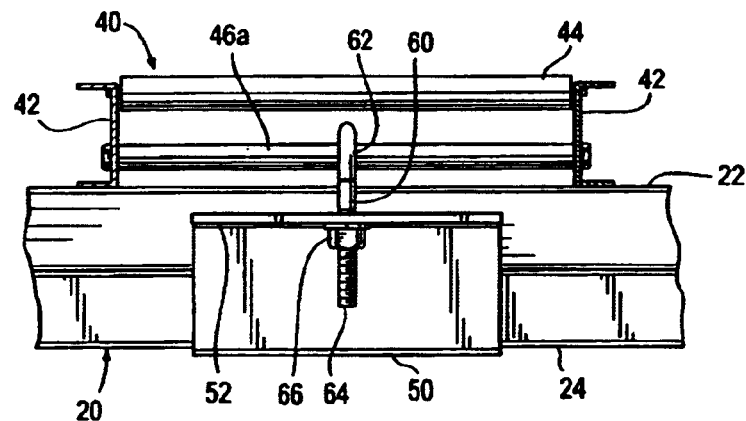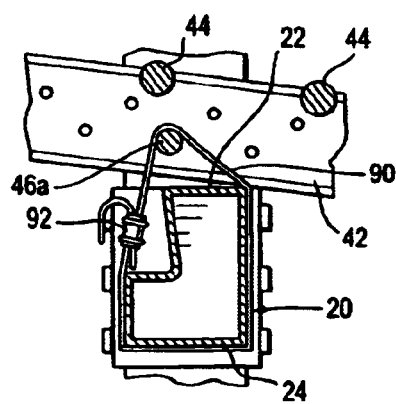

US 6,951,441 B2

STORAGE RACK HAVING ROLLER TRACK SUPPORTED ON HORIZONTALLY EXTENDING FRONT AND BACK BEAMS

TECHNICAL FIELD OF THE INVENTION

This invention pertains to a storage rack of a type comprising horizontally extending front and back beams and a roller track, which is supported above the front and back beams. The roller track may be one of plural roller tracks on a given tier, which may be one of plural tiers. If each roller track is inclined, the storage rack is known as a "carton flow" storage rack.

BACKGROUND OF THE INVENTION

Typically, as used in a storage rack, a roller track has two side rails and a series of rollers, which are journalled between the side rails and which project above the side rails. Moreover, the roller track may have a series of tie rods extending between and bracing the side rails, below the series of rollers. The roller track may be also known as a flow track or as a flow track conveyor.

As exemplified in U.S. Pat. No. 5,474,412 and No. 5,951,228, a storage rack of the type noted above has two support end bars, which are similar to the front and back beams discussed above. The storage rack exemplified therein employs two toothed retainers, each of which is fastened mechanically to one of the support end bars, to position the side rails of a flow track conveyor member so as to restrict the side rails thereof against horizontal movement along the toothed retainers and the support end bars. The storage rack exemplified therein also employs a locking pin, which is inserted into apertures in the side rails thereof and which coacts with bent-over flanges on the retainer teeth, whereby to secure the flow track conveyor member.

SUMMARY OF THE INVENTION

This invention provides a storage rack of the type noted above, in which a roller track is supported on horizontally extending front and back beams in an improved manner, without any toothed retainers and without a locking pin. In a generalized embodiment of this invention, a clip embraces an underside of one of the front and back beams and a J-bolt is connected to the clip and is hooked over one of the tie rods, whereby to secure the roller track. In a preferred embodiment of this invention, a front clip embraces an underside of the front beam, a J-bolt is connected to the front clip and is hooked over a front one of the tie rods, a back clip embraces an underside of the back beam, and a J-bolt is connected to the back clip and is hooked over a back one of the tie rods, whereby to secure the roller track.

Broadly, in the generalized embodiment of this invention, the roller track is secured by means passing under one of the front and back beams and over one of the tie rods for securing the roller track to the same one of the front and back beams. Broadly, in the preferred embodiment of this invention, the roller track is secured by means passed under the front beam and over an associated one of the tie rods for securing the roller track to the front beam and by means passed under the back beam and over an associated one of the tie rods for securing the roller track to the back beam. Moreover, as described below, alternative securing means are contemplated.

BRIEF DESCRIPTION OF THE DRAWINGS

FIG. 1 is a fragmentary, cross-sectional view of a roller track, as supported on horizontally extending front and back beams of a storage rack, in one embodiment of this invention. As illustrated in FIG. 1, the front and back beams have upper surfaces defining a horizontal plane, whereby the roller track is horizontal.

FIG. 2 is a similar view, except that the upper surface of the front beam is lower than the upper surface of the back beam so that the roller track is inclined frontwardly and downwardly, in a preferred embodiment of this invention.

FIG. 3, on a larger scale, is a fragmentary detail taken from FIG. 2.

FIG. 4, on a similar scale, is a profile view of a clip, which is one of two similar clips employed in the storage rack. FIG. 5, on a similar scale, is an upper plan of the same clip, FIG. 6 is a fragmentary, cross-sectional view taken along line 6—6 of FIG. 2, in a direction indicated by arrows.

FIG. 7, which is analogous to FIG. 3, is a fragmentary detail showing an alternative embodiment of this invention.

DETAILED DESCRIPTION OF THE ILLUSTRATED EMBODIMENTS

In the embodiment illustrated in FIG. 1 and in the preferred embodiment illustrated in FIGS. 2, 3, and 6, a storage rack 10 comprises a horizontally extending front beam 20, which has an upper surface 22, a horizontally extending back beam 30, which has an upper surface 32, and a roller track 40, which is supported on the upper surfaces 22, 32. In the embodiment illustrated in FIG. 1, the upper surfaces 22, 32, define a horizontal plane, whereby the roller track 40 is horizontal. In the preferred embodiment illustrated in FIGS. 2, 3, and 6, the upper surface 22 of the front beam 20 is lower than the upper surface 32 of the back beam 30, whereby the roller track 40 is inclined frontwardly and downwardly.

In the embodiment illustrated in FIG. 1 and in the preferred embodiment illustrated in FIGS. 2, 3, and 6, the roller track 40 comprises two side rails 42, a series of rollers 44 journalled between and projecting above the side rails 42, and a series of tie rods 46 extending between and bracing the side rails 42. Moreover, the roller track 40 is secured similarly to the front beam 20 and to the back beam 30, as described below.

In the embodiment illustrated in FIG. 1 and in the preferred embodiment illustrated in FIGS. 2, 3, and 6, a front clip 50 having a lateral flange 52 extending backwardly embraces an underside 24 of the front beam 20. Further, a J-bolt 60 is connected to the front clip 50 and is hooked over a front one 46a of the tie rods 46, near the front beam 20, at an upper, hooked end 62 of the J-bolt 60. Passing through a circular hole 54 in the lateral flange 52, a lower, threaded end 64 of the J-bolt 60 receives a lock nut 66, which is tightened via a wrench (not shown) so as to secure the roller track 40 at the front beam 20.

In the embodiment illustrated in FIG. 1 and in the preferred embodiment illustrated in FIGS. 2, 3, and 6, a back clip 70 having a lateral flange 72 facing frontwardly embraces an underside 34 of the back beam 30. Further, a J-bolt 80 is connected to the back clip 70 and is hooked over a back one 46b of the tie rods 46, at an upper, hooked end 82 of the J-bolt 80. Passing through a circular hole (not shown) in the lateral flange 72, a lower, threaded end 84 of the J-bolt 80 receives a lock nut 86, which is tightened via a wrench (not shown) so as to secure the roller track 40 at the back beam 30.

In the embodiment illustrated in FIG. 1 and in the preferred embodiment illustrated in FIGS. 2, 3, and 6, the front clip 50 and the back clip 70 are similar to each other, the J-bolt 60 and the J-bolt 80 are similar to each other, and the lock nut 66 and the lock nut 86 are similar to each other.

In the alternative embodiment illustrated in FIG. 7, the roller track 40 is supported on to the front beam 20 and is secured to the front beam 20 by a strap 90, which is made of steel, oriented polypropylene, or other industrial strapping material and which is passed under the front beam 20 and over the tie rod 46*a*, tensioned, and sealed by a seal 92. In the alternative embodiment, the roller track 40 is supported on the back beam (not shown in FIG. 7) and is secured thereto similarly.

What is claimed is:

1. A storage rack comprising horizontally extending front and back beams having upper surfaces, on which a roller track is supported, the roller track comprising two side rails, a series of rollers journalled between and projecting above the side rails, and a series of tie rods extending between and bracing the side rails, the storage rack further comprising:

a rigid clip with a bottom embracing an underside of one of the front and back beams and legs extending upwardly from said bottom adjacent the front and back, respectively, of said one beam, and a J-bolt connected to one of said legs of the clip and hooked over one of the tie rods, whereby to secure the roller track.

2. A storage rack comprising horizontally extending front and back beams having upper surfaces, on which a roller track is supported, the roller track comprising two side rails, a series of rollers journalled between and projecting above the side rails, and a series of tie rods extending between and bracing the side rails, the storage rack further comprising:

a rigid front clip with a bottom embracing an underside of one of the front and back beams and legs extending upwardly from said bottom adjacent the front and back, respectively, of said front beam, a J-bolt connected to one of said legs of the front clip and hooked over a front one of the tie rods, a rigid back clip with a bottom embracing an underside of one of the front and back beams and legs extending upwardly from said bottom adjacent the front and back, respectively, of said back beam, a J-bolt connected to one of said legs of the back clip and hooked over a back one of the tie rods, whereby to secure the roller track.

* * * * *